Figure 3:
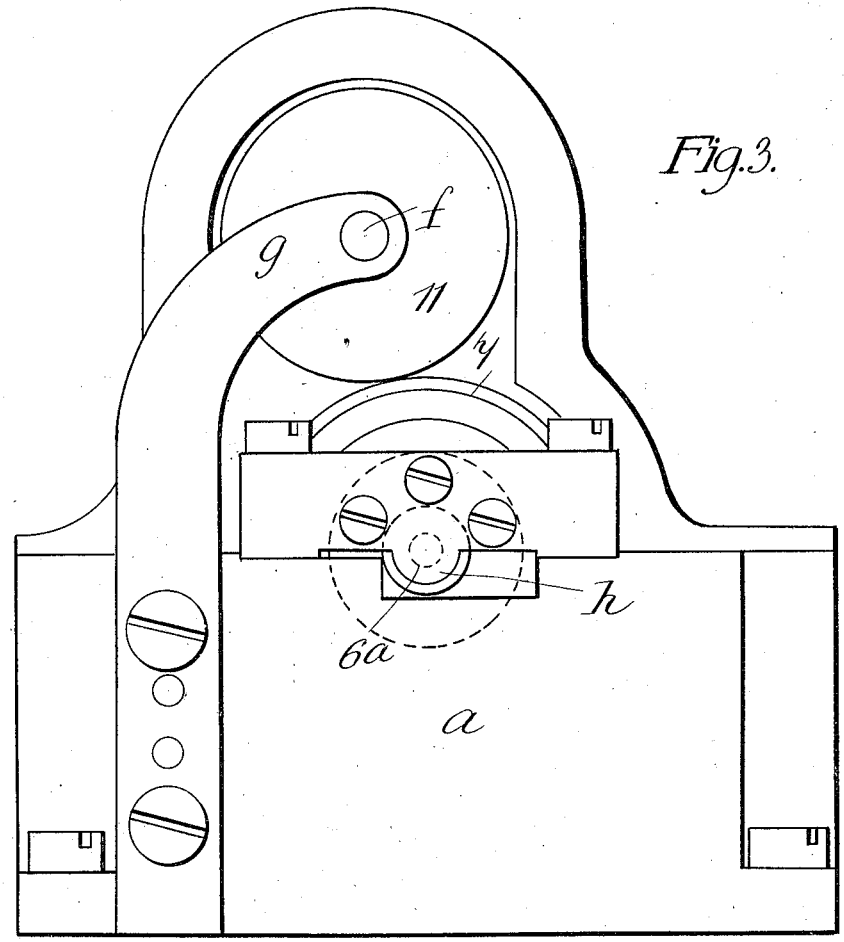

Apr. 24, 1923. 1,452,793
F. G. CREED
TELEGRAPHIC RECEIVING APPARATUS
Filed March 15, 1920 6 Sheets-Sheet 1
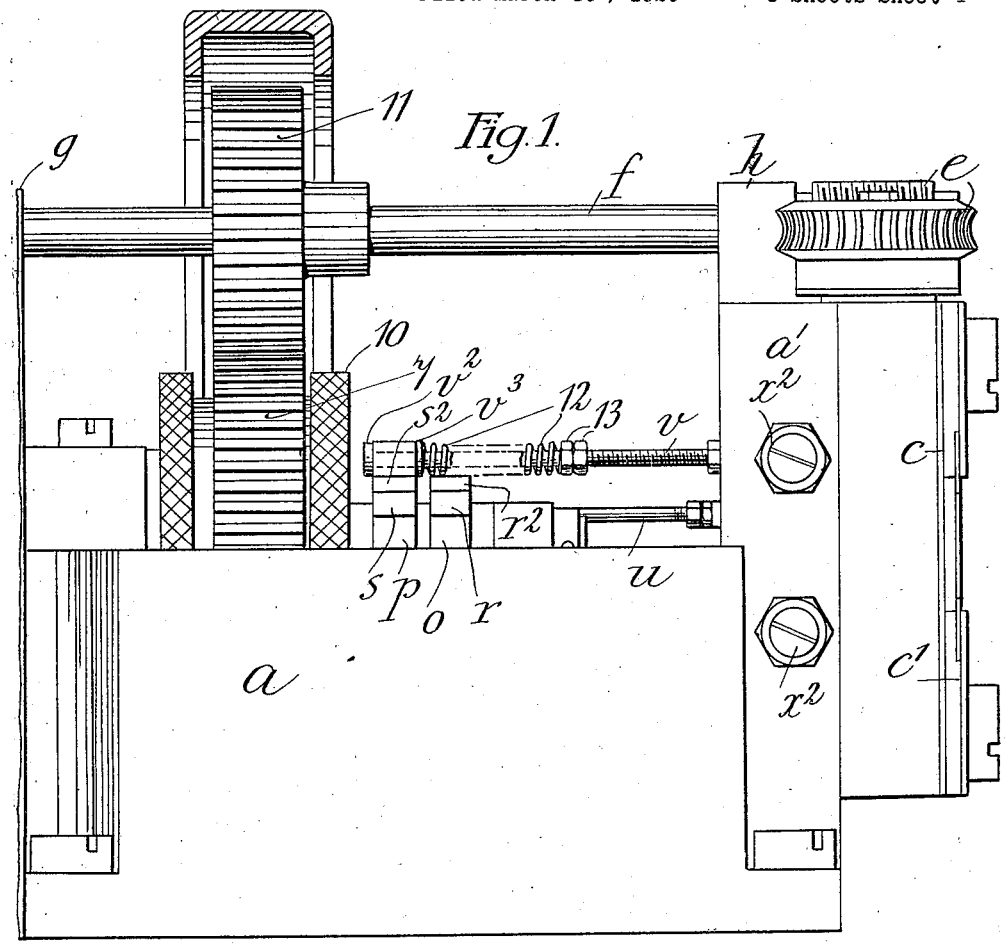
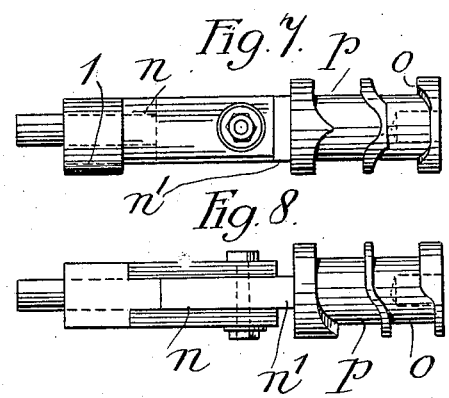

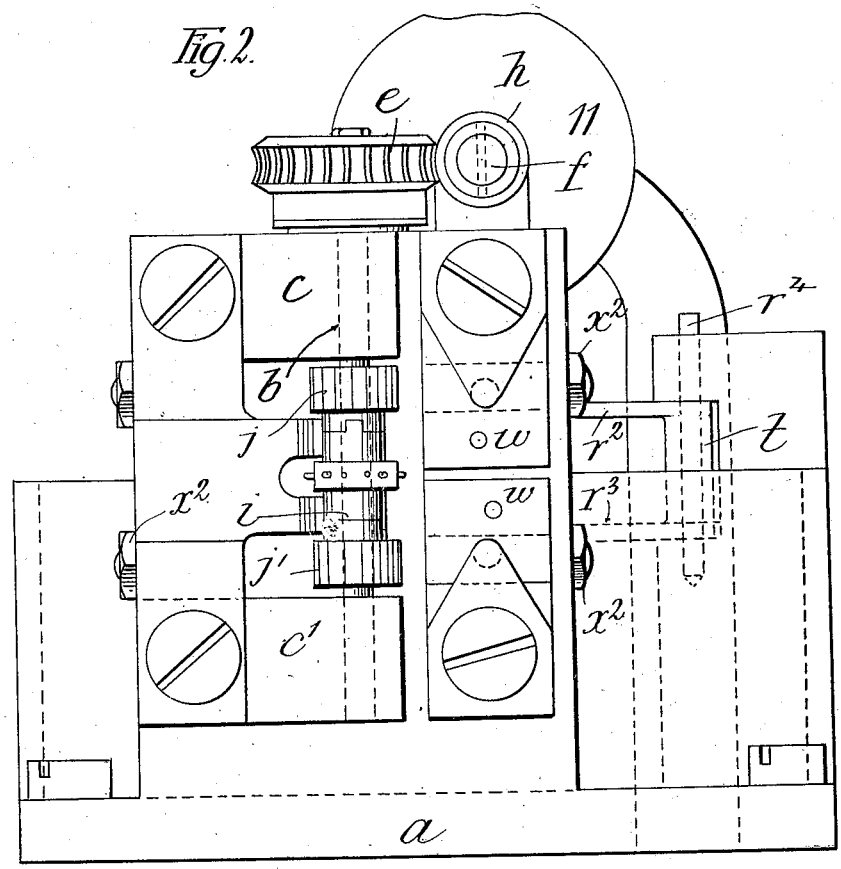
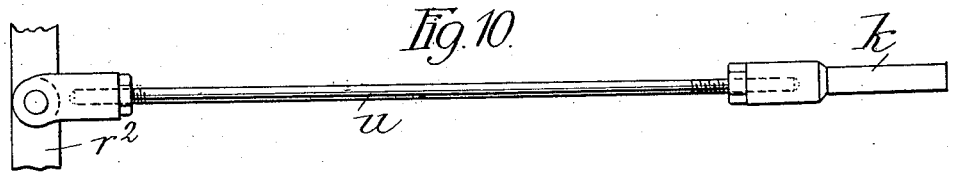
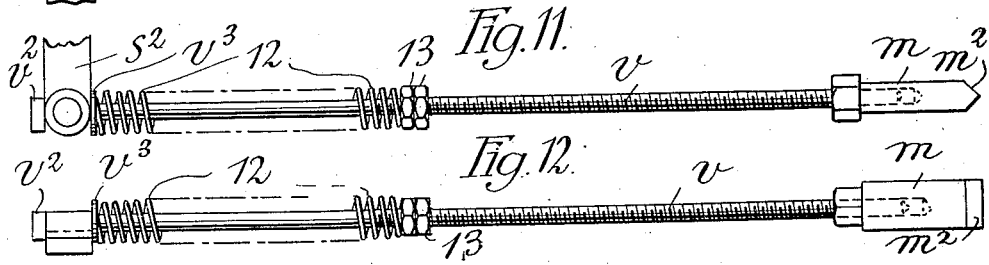

Apr. 24, 1923.

F. G. CREED

TELEGRAPHIC RECEIVING APPARATUS

Filed March 15, 1920    6 Sheets-Sheet 3

Apr. 24, 1923. 1,452,793
F. G. CREED
TELEGRAPHIC RECEIVING APPARATUS
Filed March 15, 1920    6 Sheets-Sheet 4

Frederick George Creed
By Davis & Davis
Attys

Apr. 24, 1923.　　　　　　　　　　　　　　　　　　　　1,452,793
F. G. CREED
TELEGRAPHIC RECEIVING APPARATUS
Filed March 15, 1920　　　6 Sheets-Sheet 5

Frederick George Creed
By Davis & Davis
Attys

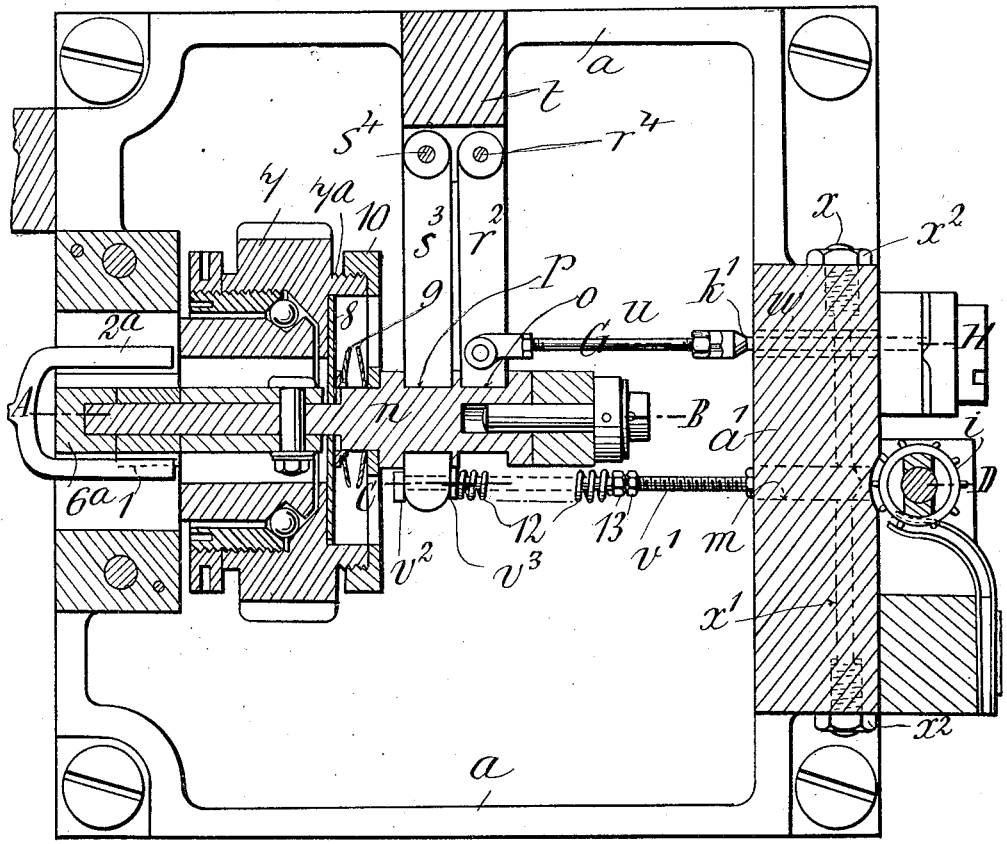

Patented Apr. 24, 1923.

1,452,793

UNITED STATES PATENT OFFICE.

FREDERICK GEORGE CREED, OF CROYDON, ENGLAND.

TELEGRAPHIC RECEIVING APPARATUS.

Application filed March 15, 1920. Serial No. 366,006.

*To all whom it may concern:*

Be it known that I, FREDERICK GEORGE CREED, a subject of the King of Great Britain and Ireland, residing at Croydon, in the county of Surrey, England, have invented Improvements in or Relating to Telegraphic Receiving Apparatus, of which the following is a specification.

This invention has reference to telegraphic receiving apparatus of the type designed to perforate telegraph tape in accordance with the Morse code in order to reproduce true Wheatstone or other tape the characteristic feature of which is that the dots and dashes or other signals of the code are represented by perforations in the tape accurately spaced in relation to a central row of feed holes in the tape, each hole, representing a dot or a dash or other signal, or a part thereof, being placed either transversely opposite or in some other fixed relation to a feed hole in the tape.

For producing such tape, the telegraphic receiving apparatus comprises (*a*), means for guiding and for perforating the tape, embodying a suitable framework and punches mounted therein; (*b*), means for feeding the tape in an endways forward direction past the punches at a rate corresponding more or less exactly to the speed at which the transmitting tape at a distant sending station passes through the telegraph transmitter at that station; (*c*), means for correcting the position of the receiving tape lengthways with relation to the punches before punching the tape and (*d*), driving means, actuated from a suitable source of power, for actuating the punches, for feeding the tape forward, and for correcting the position of the tape lengthways, should this be necessary, before the punching takes place.

Different means have heretofore been proposed for feeding the tape forward and correcting its position lengthways to ensure accurate alignment of the punched holes with the feed holes in the tape. For instance, in a telegraphic perforating receiver of the type generally known as a Creed perforator, see for example, the specifications of former British Letters Patent Nos. 2834 of 1901; 1061 of 1902; 5490 of 1905 and 23834 of 1908, the tape is fed forward by a frictionally driven toothed feed wheel with which are associated one or two toothed correcting wheels fixed on the feed wheel spindle, and one or more correcting rods adapted to be moved into engagement with the correcting wheel, or with one or other of the correcting wheels if two are used, before punching, so as to adjust the feed wheel and thereby the position of the tape lengthways, should this be necessary, before each punch commences to perforate the tape.

The means hereinbefore mentioned under (*a*) (*b*) (*c*) and (*d*) are specially adapted for high speed receivers.

Now the present invention has reference to improvements in perforating receivers of the type referred to wherein there are associated with the feed wheel, one or more correcting wheels and one or more correcting rods or their equivalent, for insuring accurate positioning of the holes to be punched in the tape in relation to the feed holes, before each punch forms a hole in the tape.

In perforating receivers of this type as heretofore used and as heretofore proposed for use, the punches have been moved into their operative positions against the action of springs that serve to return them to their inoperative position. Also, the correcting rod or rods used for adjusting the correcting wheel or wheels, feed wheel and tape has or have been positively moved in one direction and in the opposite direction by a spring. With such arrangements considerable power has to be expended on the springs in addition to that expended in useful work and the construction of the receiver is consequently somewhat complicated and costly.

Now the present invention has for its object so to construct and operate a perforating receiver of the type referred to known as a Creed perforator, that the use of springs for moving the punches and correcting rod or rods, or its or their equivalent, for example levers, into one of their two positions, can be dispensed with, so that much less power shall be needed to operate the receiver, the speed of working maintained or increased, reliability, efficient working and durability ensured, the construction simplified and the receiver reduced in weight.

To this end, in a perforating receiver according to the present invention, the punches and the correcting rod or rods, or its or their equivalent, (hereinafter included in the term correcting rod or rods) are moved both into their operative positions and into their inoperative positions and held in each position, in a positive manner, by actuating means under the control of a relay in the line wire through which the signals to be reproduced as perforations in a tape are transmitted, so that they are constrained to move in the required manner and at the required times. The to and fro motion of the punches and of the correcting rod or rods may advantageously be effected by cam or equivalent mechanism (hereinafter called for brevity the cam mechanism) operated by an electric or other suitable motor through a shaft and a yielding device, such for example as a friction device, under the control of stopping and releasing mechanism which is itself under the control of the relay so that it acts intermittently to release and stop the cam mechanism. The arrangement in each case is such that when the stopping and releasing mechanism acts to stop the cam mechanism, the punches and correcting rod or rods are held in their inoperative positions and when it acts to release the cam mechanism, the latter is caused to rapidly and positively move the correcting rod or rods and punches, in the required order, first into their operative positions and then into their inoperative positions in which latter position they will be again held by the action of the stopping and releasing mechanism until the relay again acts to free the stopping and releasing mechanism.

The stopping and releasing mechanism may advantageously be of the escapement type, one member of which is adapted to be operated by electro-magnetic means under the control of the line relay, it may be through a second and more powerful relay, and the other member of which is connected to the spindle used for operating the cam or equivalent mechanism.

Feed wheel correcting and punch operating mechanism, to operate in the manner described can be constructed in various forms. Usually, such mechanism will comprise two correcting wheels and two correcting rods or equivalent but in some cases only one correcting wheel and one correcting rod need be used, or one correcting wheel and two correcting rods acting alternately thereon. In the further description of the invention however, it will be assumed that the receiver comprises two correcting wheels and two correcting rods, though it is to be understood that only one wheel and one or two rods may be used.

Figure 4:
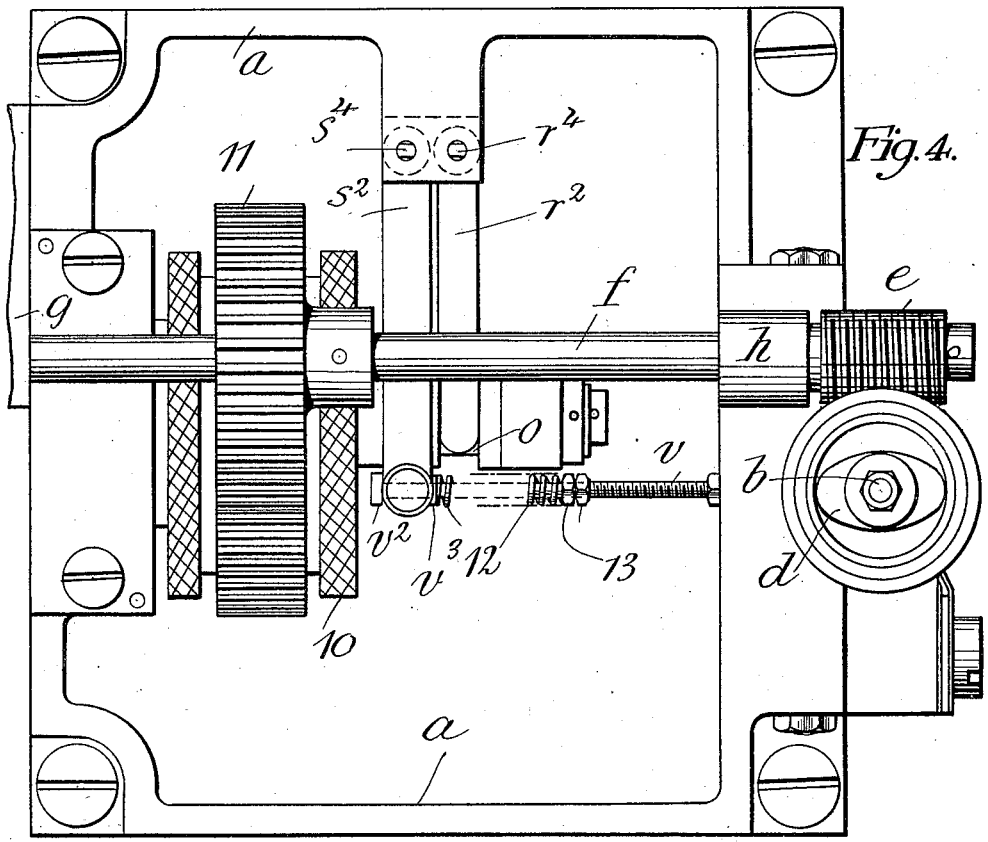
Figure 5:
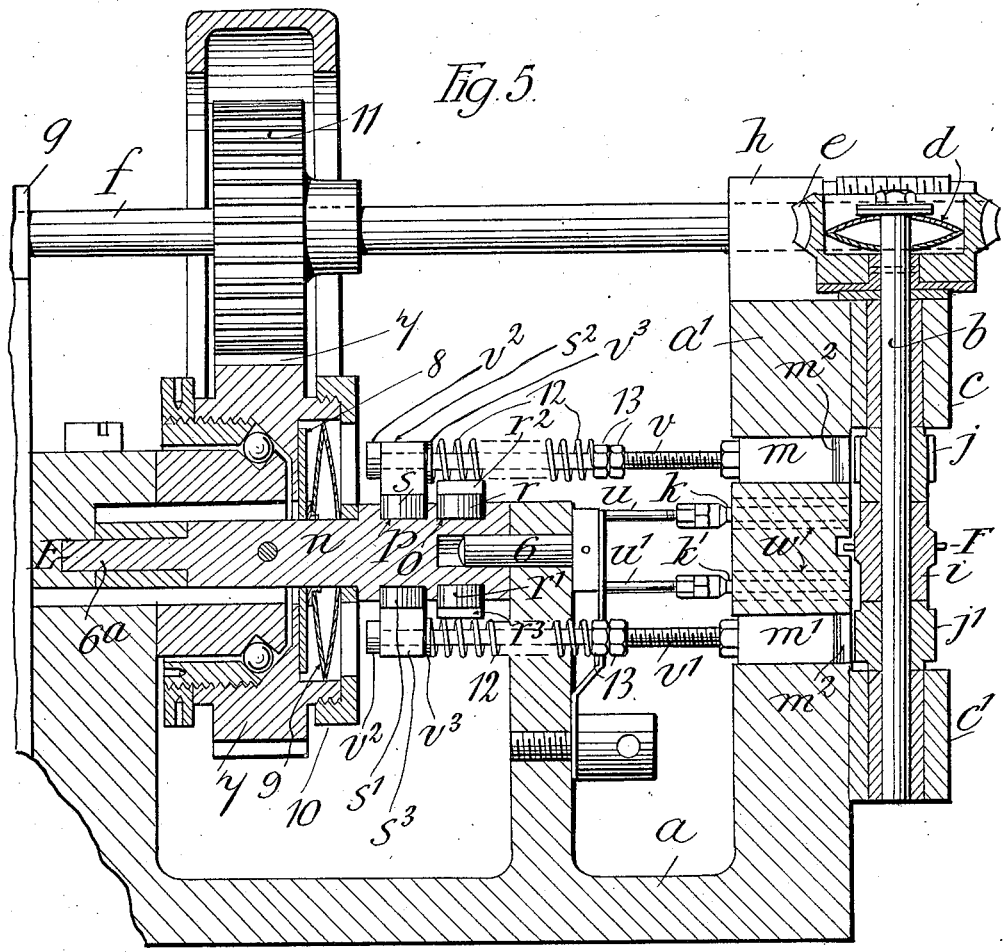

The accompanying illustrative drawings show one construction of perforating receiver embodying the invention, Fig. 1 being a side elevation, Figs. 2 and 3 right and left handed elevations, Fig. 4 a plan, Fig. 5 a vertical section partly on the line A B and partly on the line C D of Fig. 6 and Fig. 6 a horizontal section on the line E F of Fig. 5 of such perforating receiver. Figs. 7 and 8 are views at right angles to each other, and Fig. 9 an end view, showing the cam mechanism used in the receiver.

Figure 15:
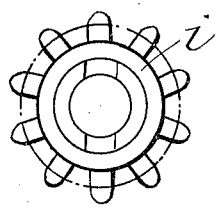
Figure 16:
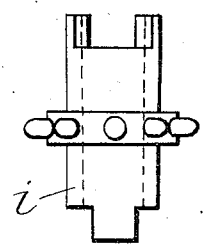
Figures 17, 18:
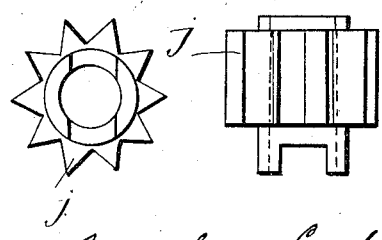
Figure 19:
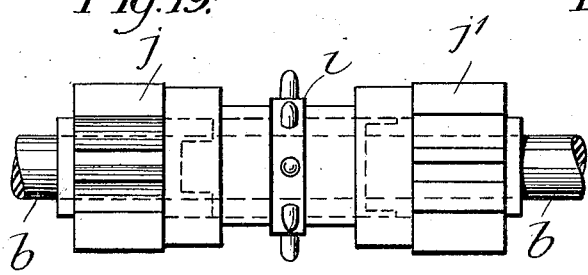
Figure 20:
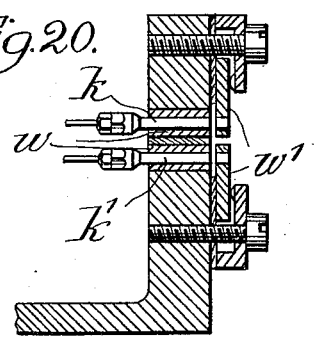
Figure 13:
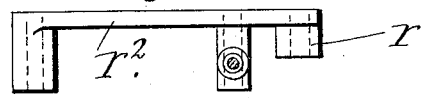
Figure 14:
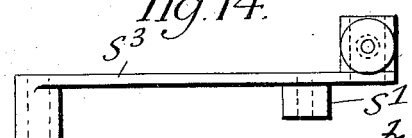

Figs. 10 to 19 inclusive are details views to a larger scale than Figs. 1 to 6 inclusive, Fig. 10 being a plan view of one of the punches and its operating rod and lever, Figs. 11 and 12 views at right angles to each other of one of the correcting rods and its operating lever, Fig. 13 an edge view of one of the punch operating levers, Fig. 14 an edge view of one of the correcting rod operating levers, Figs. 15 and 16 an end view and plan respectively of the tape feed wheel, Figs. 17 and 18 an end view and plan respectively of one of the correcting wheels, and Fig. 19 an elevation of the combined feed wheel and correcting wheel. Fig. 20 is a vertical section on the line G H of Fig. 6, showing the two punches and their associated die plates. Fig. 21 is a diagrammatic view showing the perforating receiver associated with relay mechanism.

In Figs. 1 to 6, $a$ is a stationary base or support carrying the various movable parts of the receiver. $b$ is a vertical spindle mounted in bearings $c$, $c'$ and driven through a friction clutch $d$ and worm gearing $e$ from a motor driven shaft $f$ supported in bearings $g$ and $h$ carried by the base $a$. $i$ is a tape feed wheel fixed to the spindle $b$ and $j$, $j'$ the correcting wheels mounted on the spindle $b$ and suitably connected thereto at the opposite sides of the feed wheel (Figs. 15 to 19), so as to rotate therewith. $k$, $k'$ are the two punches arranged alternately to perforate a tape fed past them through a tape guide or race $i'$ (Fig. 20) by the feed wheel $i$ and $m$, $m'$ are the two correcting rods adapted to engage alternately with the correcting wheels $j$, $j'$ respectively and adjust the position of the feed wheel in a rotary direction should this be necessary, the punches and rods being arranged to slide in corresponding holes in the vertical portion $a'$ of the base or support $a$.

The two punches $k$, $k'$ and the two correcting rods $m$, $m'$ of the punching and correcting mechanism are arranged to be reciprocated in a positive manner and at the required times by a spindle $n$ formed with two cam grooves $o$ and $p$ formed in and around its periphery, (Figs. 5, 6, 7 and 8). Each of these cam grooves is adapted to receive two rollers, $r$, $r'$ or $s$, $s'$ which are arranged at opposite sides of the spindle $n$ at a distance of 180° apart. The four rollers $r$, $r'$, $s$, $s'$, are respectively attached to levers $r^2$, $r^3$, $s^2$, $s^3$, pivoted at $r^4$ and $s^4$ to a bearing $t$ on the support $a$. One pair of rollers and levers, namely $s$ $s'$ and $s^2$, $s^3$ is adapted to actuate the pair of correcting rods $m$, $m'$ and the other pair of rollers and levers, namely $r$, $r'$ and $r^2$, $r^3$ is adapted to actuate the pair of punches $k$, $k'$, each lever being connected to its corresponding correcting rod or punch by a rod or link. In the example, each punch $k$ or $k'$ is connected to its corresponding lever $r^2$ or $r^3$ by a rod $u$ or $u'$ (Figs. 5, 6, 10 and 13). Each correcting rod $m$ or $m'$ is connected to its corresponding lever $s^2$ or $s^3$ by a rod $v$, or $v'$ (Figs. 5, 6, 11, 12 and 14). The cam grooves $o$ and $p$ are so shaped or arranged (see Figs. 7 and 8) that during the first half revolution of the spindle $n$ the correcting rod, $m$, $v$ or $m'$, $v'$ and punch $k$, $u$, or $k'$, $u'$ on one side only will be reciprocated in proper order by the cam grooves and the other correcting rod $m$, $v^1$ and punch $k'$, $u'$ will be held in the inoperative position. During the next half revolution of the spindle, the correcting rod and punch that were last reciprocated will be held stationary while the other correcting rod and punch will be reciprocated in the proper order, and so on for each half revolution of the spindle. The punches are arranged to reciprocate in hard steed bearings $w$ carried by the vertical portion $a'$ of the support $a$ and with which are associated hard steel die blocks $w$, the tape guide or race $i'$, being formed between them (Fig. 20).

By making the point of connection of each rod or link $u$, $u'$, $v$, $v'$ to its corresponding lever $r^2$, $r^3$, $s^2$, $s^3$, adjustable along the lever, which is pivoted at one end, as stated, and adjusting the point of connection, the stroke of each correcting rod and each punch can be varied to suit requirement in an accurate manner. Usually however such adjustment will not be necessary after setting the said parts and no provision therefor is made in the example shown.

The spindle $n$ is provided at one end with a tooth 1 (Figs. 6, 7 and 9) forming one member of an escapement the other member of which is constituted by the bifurcated end $2^a$ of the tongue 2, (Figs. 6 and 21) of an auxiliary relay 3 (Fig. 21) the electric circuit of which is controlled by a main relay 4 in the line circuit 5 over which signals are to be received. The said bifurcated end $2^a$ of the relay tongue 2 may, as shown, be arranged to oscillate in a fixed guideway $a^2$ in the base $a$ to support it in a direction at right angles to the plane in which it moves. In the example now being described, the spindle $n$ is mounted to turn upon a stationary pin 6 at one end and in a bearing $6^a$ at the other end and is driven by friction from a continually rotating toothed wheel 7 through a clutch comprising a plate 8 fitted on a part $n'$ (Fig. 8) of the spindle and pressed against the wheel 7 by a pair of bent spring strips 9 arranged between it and the central portion of a perforated cap piece 10 screwed on a lateral extension $7^a$ (Fig. 5) of the wheel 7. The toothed wheel 7 is rotated by a toothed wheel 11 on the driving shaft $f$ (Figs. 1, 4, and 5). The arrangement is such that when the escapement tooth 1 on the spindle $n$ is released by lateral movement of the bifurcated end $2^a$ of the tongue 2 of the second or auxiliary relay 3, under the control of the main relay 4, the spindle $n$ is suddenly revolved by the wheel 7 through the friction clutch 8, 9, through half a revolution and is then arrested by its tooth 1 coming in contact with the other limb of the bifurcated end $2^a$ of the relay tongue 2. When the relay tongue is moved in the opposite direction, the escapement tooth 1 on the spindle is released and the spindle is caused to make another half revolution and is again arrested. The successive half revolutions of the spindle operate the correcting rods and punches rapidly in the manner hereinbefore described, the speed of operation depending upon the speed of the driving shaft $f$.

One or each of the cam grooves $o$ and $p$ in the spindle $n$ may be so shaped (see Figs. 7 and 8), that the speed of rotation of the spindle will be more or less sharply checked before the escapement tooth 1 on the spindle abuts against the bifurcated end $2^a$ of the relay tongue 3, thus reducing shock.

By the construction hereinbefore described, the power necessary for operating the correcting rods and punches is only a small fraction of that required when springs are used to move the correcting rods and punches in one direction, as heretofore. It also permits of a simplification in the form of each correcting wheel $j$, $j'$ (Figs. 17 and 18) which formerly had to be made with slots having parallel sides with which a similarly shaped tooth on the corresponding correcting rod had to engage before the corresponding punch could be allowed to reach the tape to be perforated. The tooth thereafter had to slide in the slot until the perforation of the tape was complete after which both the correcting rod and punch could be withdrawn together. It sometimes happened that if the correcting rod was withdrawn before the punch, the punch then tore the paper or burred the edge of the hole, which interfered with the subsequent use of the tape. With the arrangement above described, such lack of correct relation between the correcting rod and the punch is impossible, seeing that the cam groove can be so arranged that the correcting rod will firmly hold the correcting wheel before the punch impinges on the tape and will hold it until after the punch has been positively retracted from the tape by means of its own cam groove, and this proper relation between the correcting rod and the punch, once fixed by the cam grooves, cannot alter.

In addition to this advantage, the correcting wheel, which formerly had to be made with a slot as just described, can now be made with simple V shaped teeth, as shown in Figs. 17, 18 and 19, into the space between any two of which the point $m^2$ of the corresponding correcting rod $m, v$ or $m', v'$ (Figs. 11 and 12) takes at the proper moment. This not only simplifies the form of the correcting wheel, which formerly was very expensive to make, seeing that it had to be hardened and ground on all the working faces, but it makes it possible for the wheel itself to be made smaller in diameter than before and this again makes for speed.

To enable the pointed ends $m^2$ of the correcting rods $m, m'$ to be easily and accurately adjusted in relation to one another and to the teeth of their respective correcting wheels $j$ and $j'$, the forward end portion of each rod is arranged to reciprocate, with an easy working fit, between the flat inner ends of two endways adjustable screws $x$ and $x'$ carried by the part $a'$ of the stationary support $a$. The outer ends of the screws are preferably provided with saw cuts to admit of adjustment of the screws by a screw driver, lock nuts $x^2$ being provided for fixing the screws in their adjusted positions.

In order to make it impossible for the pointed end $m^2$ of the correcting rod $m$ or $m'$ by fouling the top or tip of a tooth of the correcting wheel $j$, or $j'$, to stop the rotation of the spindle $n$ and thereby interrupt the working of the receiver, there is associated with the said correcting rod and the means used for positively actuating it, or, as in the example shown, with each correcting rod and the means used for positively actuating it, a safety device that will, under the circumstance mentioned occurring, yield to a sufficient extent to avoid damage or stoppage of the receiver. For this purpose, in the arrangement hereinbefore described, each rod or link $v$ or $v'$ between the correcting rod $m$ or $m'$ and the cam operated lever $s^2$ or $s^3$, may carry or have incorporated therein, a compressible spring or other springlike device or yielding part, shown as a coiled spring 12, through which it is operated, as by the said lever $s^2$ or $s^3$ and the action of which is such, or which can be so adjusted, as by lock-nuts 13 in the case of a coiled spring as shown, that it is just sufficient, with a reasonable margin, to resist the normal thrust of the correcting rod against the correcting wheel, but will yield to the necessary extent under the pressure of the corresponding cam operated lever $s^2$ or $s^3$, if it meets with undue resistance, due for instance to the point $m^2$ of the correcting rod fouling the top of a tooth of the correcting wheel, the end of the lever $s^2$ or $s^3$ then sliding on the end of the correcting rod. Normally, the end of the lever is engaged between a collar $v^2$ fast on the rod or link $v$ or $v'$ and a collar $v^3$ loose on the said rod or link and pressed against the lever by the coiled spring 12, (Figs. 5, 6, 11, 12 and 14). A similar safety device could, if desired, also be provided on the link $u$ or $u'$ connecting each punch $k$ or $k'$ with its corresponding actuating lever $r^2$ or $r^3$. Such a safety device forms, broadly, the subject matter of a separate application for Letters Patent of even date herewith, Serial No. 366007.

In a receiver embodying the present invention, the arrangement lends itself to great simplification and cheapening of the whole apparatus, not only the actuating mechanism, but the punch block itself.

What I claim is:—

1. In perforating apparatus of the type herein referred to, the combination with the punches for perforating a tape, of actuating means connected to said punches and adapted positively to move them into both their operative and inoperative positions so that they are constrained to move in the required manner and at the required times, and mechanically operated means adapted to operate said actuating means in an intermittent and positive manner in accordance with the perforations to be made in a tape by said punches.

2. In perforating apparatus of the type herein referred to, the combination with the punches for perforating a tape, of actuating means positively connected to said punches and adapted positively to move them in turn into both their operative and inoperative positions and to hold them in required positions, mechanically operated driving mechanism embodying a yielding connection for operating said actuating means, and means adapted to stop and release said actuating means in an intermittent manner, in accordance with the perforations to be made in a tape by said punches.

3. In perforating apparatus of the type herein referred to, the combination with the punches for perforating a tape, of actuating means positively connected to said punches and adapted positively to move them in turn into both their operative and inoperative positions and to hold them in required positions, mechanically operated driving mechanism embodying a yielding connection for operating said actuating means, and escapement mechanism adapted to stop and release said actuating means in an intermittent manner in accordance with perforations to be made in a tape by said punches.

4. In perforating apparatus of the type herein referred to, the combination with the punches for perforating a tape, of actuating means positively connected to said punches and adapted positively to move them in turn into both their operative and inoperative positions and to hold them in required positions, mechanically operated driving mechanism embodying a yielding connection for operating said actuating means, escapement mechanism adapted to stop and release said actuating means in an intermittent manner, and electro-magnetic means adapted to operate, under control of received electric signals to be reproduced as perforations in a tape by said punches, said escapement mechanism comprising a member connected to said actuating means and a member adapted to be actuated by said electro-magnetic means.

5. In perforating apparatus of the type herein referred to, the combination with a tape feed wheel, a correcting wheel for adjusting said feed wheel, a correcting device to coact with said correcting wheel and punches for perforating a tape moved by said feed wheel, of actuating means positively connected to said correcting device and to said punches and adapted positively to move said correcting device and said punches into both their operative and inoperative positions in proper order and for holding them in required positions, and mechanically operating driving means adapted to operate said actuating means in an intermittent manner in accordance with the perforations to be made in a tape by said punches.

6. In perforating apparatus of the type herein referred to, the combination with a tape feed wheel, a correcting wheel for adjusting said feed wheel, a correcting device to co-act with said correcting wheel and punches for perforating a tape moved by said feed wheel, of actuating means positively connected to said correcting device, separate actuating means positively connected to said punches, both actuating means being adapted positively to move said correcting device and said punches into both their operative and inoperative positions in proper order and for holding them in required positions, mechanically operated driving mechanism embodying a yielding connection for operating both of said actuating means and means adapted to stop and release both of said actuating means in accordance with the perforations to be made in a tape by said punches.

7. In perforating apparatus of the type herein referred to, the combination with a tape feed wheel a correcting wheel for adjusting said feed wheel, a correcting device to co-act with said correcting wheel and punches for perforating a tape moved by said feed wheel, of actuating means positively connected to said correcting device, actuating means positively connected to said punches, the two said actuating means being adapted positively to move said correcting device and said punches into both their operative and inoperative positions in proper order and for holding them in required positions, mechanically operated driving mechanism embodying a yielding connection for operating both of said actuating means and escapement mechanism adapted to stop and release both of said actuating means in an intermittent manner in accordance with perforations to be made in a tape by said punches.

8. In perforating apparatus of the type herein referred to, the combination with a tape feed wheel, a correcting wheel for adjusting said feed wheel, a correcting device to co-act with said correcting wheel and punches for perforating a tape moved by said feed wheel, of actuating means positively connected to said correcting device, actuating means positively connected to said punches, the two said actuating means being adapted positively to move said correcting device and said punches into both their operative and inoperative positions in proper order and to hold them in required positions, mechanically operated driving mechanism embodying a yielding connection for operating both of said actuating means, and escapement mechanism adapted to stop and release said actuating means in an intermittent manner and electro-magnetic means adapted to operate, in accordance with the perforations to be made in a tape by said punches, said escapement mechanism comprising a member connected to said actuating means and a member adapted to be actuated by said electro-magnetic means.

9. In perforating apparatus of the type herein referred to, the combination with a tape feed wheel, a correcting wheel for adjusting said feed wheel, a correcting device to co-act with said correcting wheel and punches for perforating a tape moved by said feed wheel, of actuating means positively connected to said correcting device, actuating means positively connected to said punches, both actuating means being adapted positively to move said correcting device and said punches into both their operative and inoperative positions in proper order and to hold them in required positions, mechanically operated driving mechanism embodying a yielding connection for operating both of said actuating means, escapement mechanism and an electric relay mechanism adapted to be controlled by electric signals in a line wire and to actuate a member of the escapement mechanism in order to stop and release both of said actuating mechanisms at the required times.

10. In perforating apparatus, the combination with a tape feed wheel, a correcting wheel for adjusting said feed wheel, a correcting device to co-act with said correcting wheel and punches for perforating tape fed endways by said feed wheel, of actuating mechanism for positively moving said correcting device and punches, in proper order, into both their operative and inoperative positions and holding them in required positions, said actuating mechanism comprising a spindle having separate cam grooves in its periphery, a lever connected to said correcting device and adapted to be positively oscillated by one of said cam grooves, levers separately connected to said punches and adapted to be positively oscillated at different times by the other cam groove, driving mechanism for said spindle embodying a yielding device, and starting and stopping mechanism for releasing and arresting said actuating means at the required times.

11. In perforating apparatus, the combination with a tape feed wheel, a correcting wheel for adjusting said feed wheel, a correcting device to co-act with said correcting wheel and punches for perforating tape fed endways by said feed wheel, of actuating mechanism for positively moving said correcting device and punches, in proper order, into both their operative and inoperative positions and holding them in required positions, driving mechanism for operating said actuating mechanism, comprising a driving member and a friction clutch between said driving member and actuating mechanism, and starting and stopping mechanism for releasing and arresting their actuating means at the required times.

12. In perforating apparatus, the combination with a tape feed wheel, a correcting wheel for adjusting said feed wheel, a correcting device to co-act with said correcting wheel and punches for perforating tape fed endways by said feed wheel, of actuating mechanism for positively moving said correcting device and punches, in proper order, into both their operative and inoperative positions and holding them in required positions, driving mechanism embodying a friction clutch for driving said actuating mechanism and starting and stopping mechanism for alternately releasing said actuating means and allowing the same to be driven by said driving means and for stopping said actuating means, said starting and releasing mechanism comprising an escapement one member of which is connected to the actuating means and the other member of which is adapted to be oscillated at the required times, to alternately release and arrest the other member.

13. In perforating apparatus, the combination with a tape feed wheel, a correcting wheel for adjusting said feed wheel, a correcting device to co-act with said correcting wheel, and punches for perforating tape fed endways by said feed wheel, of actuating mechanism for positively moving said correcting device and punches, in proper order, into both their operative and inoperative positions and holding them in required positions, driving mechanism embodying a friction clutch for operating said actuating means, escapement mechanism for stopping and releasing said actuating means, one member of said escapement mechanism being connected to said actuating means an electric relay for connection to a line wire, and electro-magnetic mechanism controlled by said relay and adapted to actuate the second member of said escapement mechanism to alternately release and arrest the first member of said escapement mechanism.

14. In a perforating receiver, the combination with a feed wheel, a correcting wheel therefor, a correcting device co-acting with said correcting rod, and two punches, of a rotary spindle formed with two peripheral cam grooves, a lever adapted to reciprocate said correcting device and provided with a roller engaging one of said cam grooves, separate levers connected to said punches and provided with rollers engaging diametrically arranged portions of the second cam groove, a driving wheel, a friction clutch between said spindle and driving wheel and starting and stopping mechanism for alternately releasing and arresting said spindle at the required times.

15. In perforating apparatus of the kind herein referred to, the combination with a tape feed wheel, a toothed correcting wheel adapted to adjust the position of said feed wheel, a correcting device adapted to co-act with said correcting wheel for the purpose set forth and means for reciprocating said correcting device, of laterally adjustable means arranged at opposite sides of said correcting device whereby the position of said device can be adjusted laterally in relation to said correcting wheel for the purpose set forth.

16. Perforating apparatus according to claim 15, wherein the laterally adjustable means comprises a pair of endways adjustable screws between the adjacent ends of which the correcting device is arranged to reciprocate.

17. In perforating apparatus according to claim 14, safety means arranged between said correcting device and the lever for reciprocating said device and capable of yielding in the event of the correcting device fouling the tip of a tooth of the correcting wheel.

18. Telegraphic receiving apparatus comprising a tape feed wheel toothed correcting wheels arranged at opposite sides of said feed wheel and adapted to adjust the same in a rotary direction, two correcting rods adapted to co-act alternately with said correcting wheels, two punches, a rotary spindle having two cam grooves in and around its periphery, two levers connected to the respective correcting rods and provided with rollers engaging diametrically opposite portions of one of said cam grooves for reciprocating said correcting rods alternately, two levers connected to the respective punches and provided with rollers engaging opposite portions of the second cam groove for reciprocating said punches alternately, a driving wheel, a friction clutch between said driving wheel and spindle, an escapement device, one member of which is connected to said spindle, and electro-magnetic mechanism adapted to be operated by an electric relay in a line circuit and to reciprocate the second member of the escapement device for the purpose set forth.

Signed at London, England, this 2nd day of March, 1920.

FREDERICK GEORGE CREED.